US009815555B2

(12) United States Patent
Riedel et al.

(10) Patent No.: US 9,815,555 B2
(45) Date of Patent: Nov. 14, 2017

(54) COVER FOR A SEAT IN AN AIRCRAFT OR SPACECRAFT

(71) Applicant: AIRBUS OPERATIONS GMBH, Hamburg (DE)

(72) Inventors: Christian Riedel, Bliedersdorf (DE); Stefan Mahn, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 100 days.

(21) Appl. No.: 14/222,177

(22) Filed: Mar. 21, 2014

(65) Prior Publication Data

US 2014/0284972 A1 Sep. 25, 2014

Related U.S. Application Data

(63) Continuation of application No. PCT/EP2012/069202, filed on Sep. 28, 2012.
(Continued)

(30) Foreign Application Priority Data

Sep. 28, 2011 (DE) .................. 10 2011 083 626

(51) Int. Cl.
  *B64D 11/00* (2006.01)
  *B64D 11/06* (2006.01)
(Continued)

(52) U.S. Cl.
  CPC .......... *B64D 11/00155* (2014.12); *B60N 2/58* (2013.01); *B60R 11/0229* (2013.01); *B64D 11/0015* (2013.01); *B64D 11/00152* (2014.12); *B64D 11/06* (2013.01); *B64D 11/0647* (2014.12); *B60R 2011/0015* (2013.01); *B60R 2011/0096* (2013.01)

(58) Field of Classification Search
  None
  See application file for complete search history.

(56) References Cited

U.S. PATENT DOCUMENTS 4,440,443 A * 4/1984 Nordskog ................ A47C 7/38
                                                         297/217.4
5,529,265 A   6/1996 Sakurai
(Continued)

FOREIGN PATENT DOCUMENTS

DE        197 05 754 A1   8/1998
DE    10 2006 007 284 A1   8/2007
(Continued)

OTHER PUBLICATIONS

International Search Report for Application No. PCT/EP2012/069202 dated Dec. 21, 2012.
(Continued)

*Primary Examiner* — David E Allred
(74) *Attorney, Agent, or Firm* — Jenkins, Wilson, Taylor & Hunt, P.A.

(57) ABSTRACT

The present invention provides a cover for a seat in an aircraft or spacecraft, including a receiver which is configured to receive in an exchangeable manner an electronic device which is fitted with a screen, at least one recess being provided in the region of the receiver such that the screen of the electronic device is exposed for viewing.

17 Claims, 3 Drawing Sheets

Related U.S. Application Data

(60) Provisional application No. 61/540,267, filed on Sep. 28, 2011.

(51) Int. Cl.
  *B60N 2/58* (2006.01)
  *B60R 11/02* (2006.01)
  *B60R 11/00* (2006.01)

(56) References Cited

U.S. PATENT DOCUMENTS

| | | | | |
|---|---|---|---|---|
| 5,957,528 A * | 9/1999 | Campbell | B60N 2/6036 | 297/218.4 |
| 6,092,705 A * | 7/2000 | Meritt | B60R 11/02 | 224/275 |
| 6,149,234 A * | 11/2000 | Daniels | A47C 1/143 | 297/188.06 |
| 6,216,927 B1 * | 4/2001 | Meritt | B60R 11/02 | 224/275 |
| 6,370,037 B1 | 4/2002 | Schoenfish | | |
| 6,575,533 B1 * | 6/2003 | Kicos | A47C 31/11 | 297/188.06 |
| 6,619,605 B2 | 9/2003 | Lambert | A47C 7/72 | 224/275 |
| 6,648,410 B2 * | 11/2003 | Sparks | B60N 2/6036 | 297/228.1 |
| 6,669,285 B1 | 12/2003 | Park | | |
| 6,709,278 B2 * | 3/2004 | Liu | G06F 1/1626 | 439/165 |
| 6,905,167 B2 | 6/2005 | Jost | | |
| 7,000,984 B1 * | 2/2006 | Ward | A47C 31/113 | 297/188.2 |
| 7,206,614 B2 * | 4/2007 | Kortum | H01R 27/00 | 379/142.13 |
| 7,597,393 B1 | 10/2009 | Tuccinardi et al. | | |
| 7,945,934 B2 * | 5/2011 | Margis | H04N 7/163 | 725/74 |
| 8,042,869 B2 * | 10/2011 | McClintock | B62B 3/144 | 297/219.12 |
| 8,197,000 B1 * | 6/2012 | Cohen | A47C 4/30 | 297/17 |
| 8,711,291 B2 | 4/2014 | Kim et al. | | |
| 8,827,072 B2 * | 9/2014 | Herron | A63B 55/00 | 206/315.3 |
| 9,216,695 B2 * | 12/2015 | Gagnier | B60N 2/58 | |
| 9,283,897 B2 | 3/2016 | Wolgast et al. | | |
| 9,567,767 B2 * | 2/2017 | Kendrick | E04H 15/34 | |
| 2003/0127890 A1 * | 7/2003 | Moon | A47C 19/022 | 297/228.1 |
| 2003/0155796 A1 * | 8/2003 | DePaulis | B60N 2/60 | 297/229 |
| 2003/0226148 A1 | 12/2003 | Ferguson | | |
| 2004/0032543 A1 | 2/2004 | Chang | | |
| 2004/0144817 A1 | 7/2004 | Albert et al. | | |
| 2004/0145684 A1 | 7/2004 | Albert et al. | | |
| 2004/0182485 A1 | 9/2004 | Gomes | | |
| 2005/0132407 A1 | 6/2005 | Boyer, Jr. et al. | | |
| 2005/0204596 A1 | 9/2005 | Peng | | |
| 2005/0206206 A1 | 9/2005 | Peng | | |
| 2006/0033366 A1 * | 2/2006 | Jeffrey | A47C 7/38 | 297/220 |
| 2006/0208020 A1 | 9/2006 | Albert et al. | | |
| 2007/0222248 A1 | 9/2007 | Maulden | | |
| 2008/0157574 A1 | 7/2008 | LaRussa | | |
| 2008/0170165 A1 | 7/2008 | Lee | | |
| 2008/0252798 A1 | 10/2008 | Vitito | | |
| 2009/0089841 A1 * | 4/2009 | Hanlon | B60R 11/02 | 725/75 |
| 2009/0218855 A1 * | 9/2009 | Wolas | B60N 2/5657 | 297/180.14 |
| 2010/0007805 A1 | 1/2010 | Vitito | | |
| 2010/0117415 A1 * | 5/2010 | Goetsch | A47C 27/086 | 297/227 |
| 2011/0174926 A1 | 7/2011 | Margis et al. | | |
| 2011/0278885 A1 | 11/2011 | Procter | | |
| 2012/0139303 A1 | 6/2012 | Westerink et al. | | |
| 2012/0212012 A1 | 8/2012 | Berger | | |
| 2013/0001987 A1 * | 1/2013 | Heredia | B64D 11/0015 | 297/163 |
| 2013/0119716 A1 * | 5/2013 | Stronconi | B60N 2/4805 | 297/180.1 |
| 2013/0119727 A1 | 5/2013 | Lavelle | | |
| 2013/0242523 A1 | 9/2013 | Wallace | | |
| 2013/0248310 A1 * | 9/2013 | Taylor-Phillips | A45C 5/005 | 190/111 |
| 2013/0249202 A1 * | 9/2013 | White | B62B 9/26 | 280/769 |
| 2013/0292975 A1 | 11/2013 | Yu | | |
| 2013/0328362 A1 * | 12/2013 | Miller | A47C 7/62 | 297/188.2 |
| 2014/0209494 A1 * | 7/2014 | Shieh | A63B 29/08 | 206/315.1 |
| 2014/0265481 A1 * | 9/2014 | Riedel | B64D 11/06 | 297/217.4 |
| 2014/0265483 A1 * | 9/2014 | Miller | A47C 31/11 | 297/228 |
| 2014/0284973 A1 | 9/2014 | Wolgast et al. | | |
| 2014/0284976 A1 * | 9/2014 | Riedel | B64D 11/0015 | 297/217.4 |
| 2014/0361569 A1 | 12/2014 | Crepaldi | | |
| 2015/0034687 A1 | 2/2015 | Terleski | | |
| 2015/0123433 A1 * | 5/2015 | Lamb, Jr. | B60R 11/0229 | 297/188.05 |
| 2015/0257370 A1 * | 9/2015 | Craig | A01K 27/008 | 224/218 |
| 2015/0343957 A1 * | 12/2015 | Narayanan | B60R 11/02 | 224/275 |
| 2016/0039349 A1 * | 2/2016 | Casagrande | B60R 7/08 | 248/205.1 |
| 2016/0137138 A1 * | 5/2016 | Dyle | B60N 2/58 | 297/188.04 |
| 2016/0152340 A1 * | 6/2016 | Bauer | B64D 11/0624 | 297/217.3 |
| 2016/0297461 A1 * | 10/2016 | Barr-Perea | B62B 3/1464 | |

FOREIGN PATENT DOCUMENTS

| | | |
|---|---|---|
| DE | 10 2011 083 622 A1 | 3/2013 |
| WO | WO 01/96150 A1 | 12/2001 |
| WO | WO 02/073754 A1 | 9/2002 |
| WO | WO 03/106261 A1 | 12/2003 |
| WO | WO 2007/109703 A2 | 9/2007 |
| WO | PCT/EP2012/069197 | 4/2013 |

OTHER PUBLICATIONS

Final Office Action for U.S. Appl. No. 14/222,184 dated Aug. 5, 2015.

Notice of Allowance for U.S. Appl. No. 14/222,184 dated Nov. 9, 2015.

Non-Final Office Action for U.S. Appl. No. 14/222,184 dated Apr. 3, 2015.

\* cited by examiner

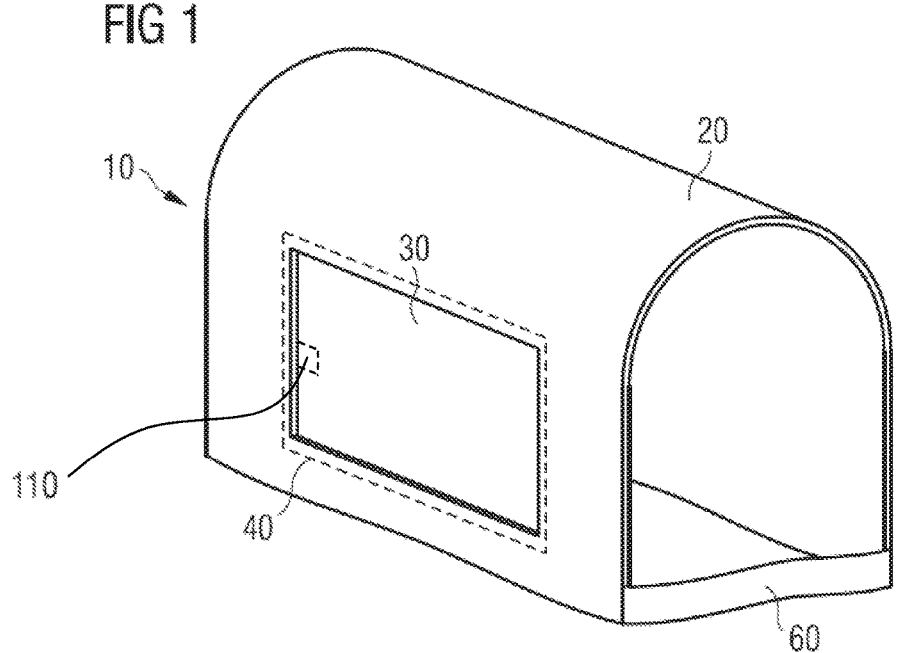
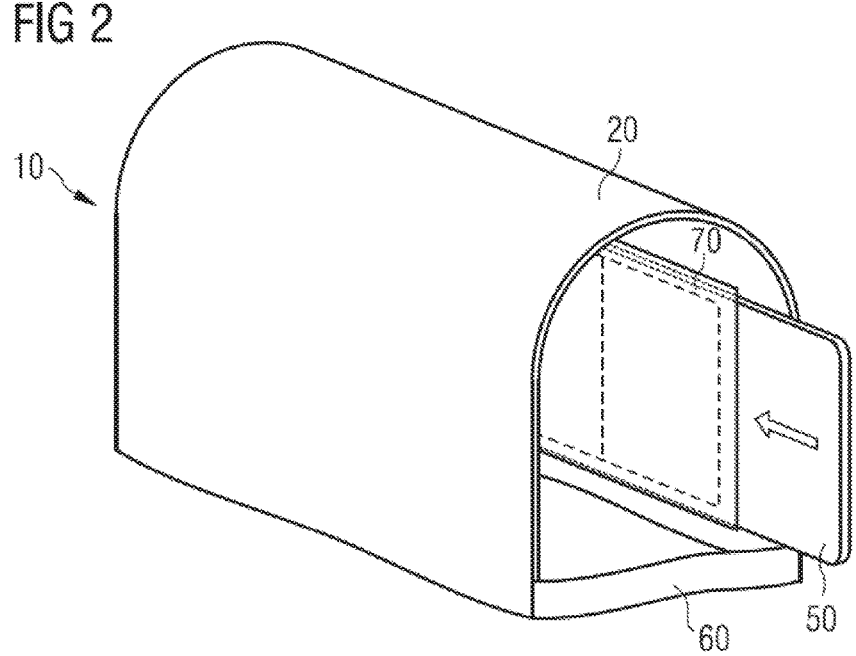

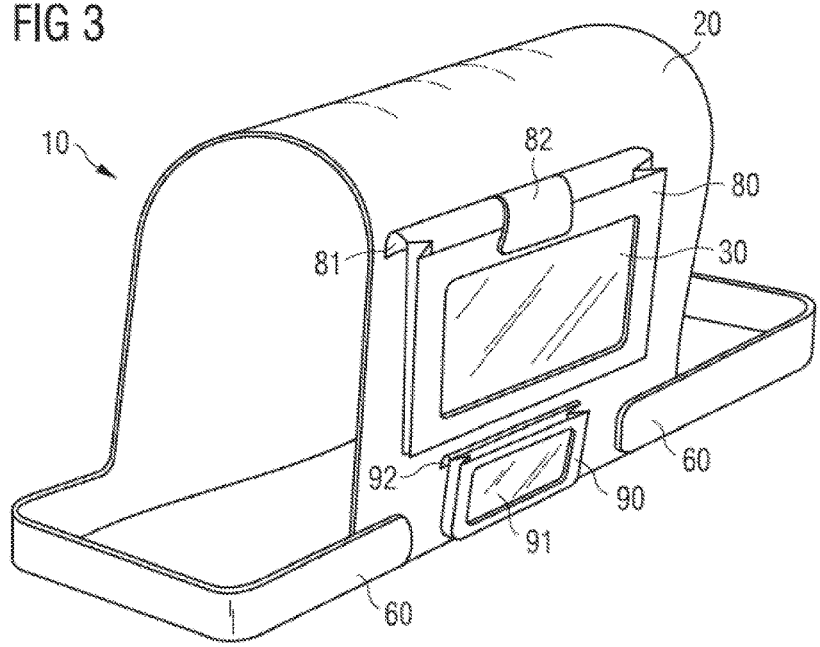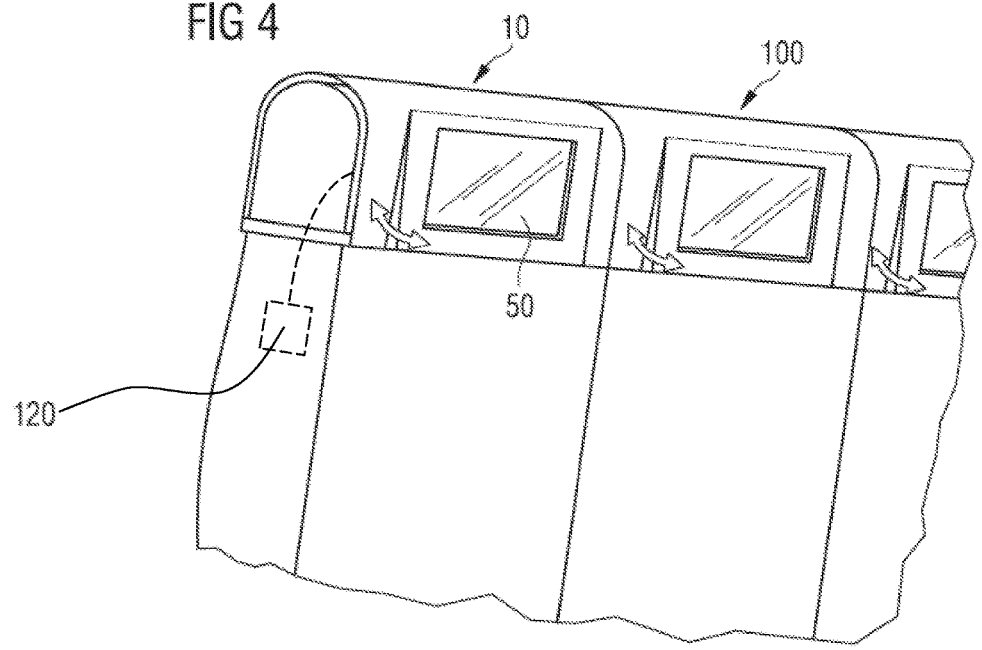

COVER FOR A SEAT IN AN AIRCRAFT OR SPACECRAFT

CROSS-REFERENCE TO RELATED APPLICATIONS

This application is a continuation of and claims priority to International Patent Application No. PCT/EP2012/069202 filed Sep. 28, 2012, which claims the benefit of and priority to U.S. Provisional Application No. 61/540,267 filed Sep. 28, 2011, and German Patent Application No. 10 2011 083 626.8, filed Sep. 28, 2011, the entire disclosures of which are herein incorporated by reference.

TECHNICAL FIELD

The present invention relates to a cover for a seat in an aircraft or spacecraft. Although the present invention can be applied to any seat covers in an aircraft or spacecraft, the invention and the problem it addresses will be described in detail in respect of an aircraft.

BACKGROUND

Seat covers in aircraft are usually arranged in the region of the headrests of the seats and are placed over the headrest. The general purpose of seat covers is to physically separate a contact region of the passenger with the headrest from the surface of the headrest, thereby avoiding direct contact between the passenger and the headrest for reasons of hygiene. This is particularly in view of the fact that during long-haul flights, the headrest is preferably used for supporting the passenger's head while he/she sleeps, and the use of the seat cover is to prevent the headrest from becoming soiled by the passenger.

From the prior art, US 2004/0182485 A1 discloses a removable cover for a seat, which cover offers a large selection of motifs printed on the surface. The cover is joined to the headrest of the seat by a plurality of Velcro® fastenings. If a display device, for example a screen, is present in the region of the seat cover, individual Velcro® fastenings can be selectively undone and the corresponding portion of the seat cover is thereby removed from the region of the display device. A disadvantage of this arrangement is that the seat cover does not afford any possibility of attaching a display device if such a device is not provided on the headrest.

SUMMARY

It is therefore an idea of the present invention to provide a cover for a seat in an aircraft or spacecraft, which cover can be used with a display device and can be easily retrofit for existing seats in an aircraft or spacecraft.

According thereto, a seat cover with a recess is provided which has a receiver to receive an electronic device fitted with a screen, a receiver for receiving the screen of the electronic device being provided in the region of the recess.

One fundamental idea of the present invention is that the seat cover acquires an additional functionality by receiving the electronic device, the seat cover having a recess so that the electronic device can be observed, and the electronic device can be attached onto the seat by the seat cover.

An advantage of the present invention is that the airline is now able to offer electronic entertainment devices in the seat cover, the use of which is not subject to strict approval tests, as is the case for head impact situations. Furthermore, by the present seat cover, the airline can use so-called COTS devices (commercial-off-the-shelf devices, i.e. commercially available devices) with a substantially more favourable cost price compared to monitors of the in-flight entertainment system, which hitherto have been fixedly installed in the rearward region of the aircraft seat.

Furthermore, with the present seat cover it is possible to provide the passenger with an electronic device, and no modifications whatsoever have to be made to the aircraft seat in order to attach the device to said seat. Consequently, the present seat cover can easily be retrofit to existing aircraft seats which have a headrest. Moreover, the seat cover can be secured by a fastening mechanism (for example by Velcro® fastenings) to the headrest of the seat such that the seat cover can invariably be adapted to different sizes of headrest.

In addition thereto, advantageously the electronic device can easily be adapted to the respective state of the art by the exchange thereof, so that the airline can react within the shortest possible time to the relatively short innovation cycles of an electronic device of this type.

The present seat cover should generally consist of a non-rigid material, i.e. no bending moments can be transferred by the material. Thus, the seat cover can consist of a cloth material or of a woven fabric, for example.

Advantageous configurations and improvements of the invention are set out in the subclaims.

According to a configuration, the receiver is arranged inside the seat cover. This measure advantageously prevents the unauthorised removal of the device by the passenger.

According to a further configuration, the receiver is arranged on the outside of the seat cover. This makes it possible for the passenger to accommodate an electronic device which he/she has brought on board, or to accommodate a so-called personal electronic device (PED) in the receiver and to use the functions thereof as well as the content located thereon during the flight.

According to a further configuration, the receiver is configured such that the electronic device is received in the receiver in an exchangeable manner. Thus, the electronic device accommodated in the present seat cover can be exchanged for any newer model.

According to a further configuration, the receiver is configured to receive an electronic device in the form of a tablet PC or a PDA. The use of a tablet PC or of a PDA for the electronic device quite substantially reduces the cost price thereof compared to a screen and the components of a conventional IFE system, because these are products which are manufactured for the mass market and hence can be supplied cheaply. Furthermore, by now the screens of entertainment devices of this type are large enough to allow films to be presented thereon in an appropriately high resolution. Due to the continuous development and the strong competition of electronic devices of this type, relatively short innovation cycles exist for these products, so that while sitting in the aircraft seat, the passenger can avail himself/herself in each case of the additional facilities of the relatively new devices.

According to a further configuration, the receiver is configured in the manner of a pocket for holding the electronic device. Consequently, the receiver can be configured in a constructively simple manner and can be arranged in the region of the inside as well as in the region of the outside of the seat cover. Furthermore, the pocket configuration makes it particularly easy for a PED device to be accommodated in an additional receiver, thereby enhancing the use for the passenger.

According to a further configuration, the pocket has a closing means which is configured such that it protects the electronic device accommodated in the pocket against theft. A closing means of this type can be realised, for example, by a strap with a lock arranged on the inside to join the closing means to the seat cover.

According to a further configuration, the receiver is arranged on the side remote from the contact region between the seat cover and a passenger. The device is thus arranged in the rearward region of the headrest of the aircraft seat, so that it can easily be seen by the respective passenger.

According to a further configuration, the receiver is configured to provide a plurality of inserts for receiving the electronic device. Each individual insert is preferably configured to be able to receive a respective electronic device with predetermined dimensions. The inserts are each arranged such that they adjoin one another and are staggered in one direction, in particular in the depth direction and they preferably allow the electronic device to be removed from and inserted into the receiver in each case in one direction, preferably in a vertical direction or sideways.

According to a further configuration, the seat cover has fastening elements for joining the cover to the seat, which fastening elements are configured and shaped such that they are used to attach the cover to seats which have differing dimensions. In particular, these fastening elements are used to join the seat cover to headrests with differing dimensions.

According to a further configuration, the receiver is joined to the seat cover such that the receiver is configured to be adjustable with respect to the seat cover. Thus, a hinge arrangement can preferably be arranged on the receiver which joins together the receiver and the seat cover so that, during operation, the electronic device can be swivelled along a swivel axis. As a result, the electronic device can be swivelled within a specific swivel angle range towards or away from the passenger, which is particularly advantageous in a situation in which the seat belonging to the cover is adjusted.

According to a further configuration, the receiver is configured to provide an adapter for receiving the electronic device. The receiver is thereby able to receive electronic devices with differing dimensions. An adapter of this type can be realised, for example as a casing which bridges a distance between the outer surface of the electronic device and the receiver in a vertical and/or horizontal direction. In an equivalent alternative, a plurality of separate components can also be used for receiving and securing the electronic device in the receiver.

According to a further configuration, the seat cover can be connected to an electrical power supply of the seat and the receiver is configured such that it has an electric interface to the electrical energy supply of the electronic device. Consequently, during the flight, the electronic device can advantageously be supplied with electrical energy for the operation thereof and for charging the energy storage thereof. The interface used for charging the electronic device is preferably a standardised interface, for example a USB interface.

According to a further configuration, the seat cover realises an enlarged presentation of the screen of the electronic device. Advantageously, this makes it possible for the passenger to view an enlarged picture presented by the electronic device, thereby enhancing passenger comfort.

According to a further configuration, the receiver can comprise a protective element which is to protect the screen of the electronic device and is arranged in the region of the outside of the receiver or in the region of the inside of the seat cover. In this respect, the protective element can be, for example, a safety screen which consists of Plexiglas® or of a transparent plastics material. Furthermore, the surface of the protective element can be substantially reflection-free.

Furthermore, a seat having at least one cover according to the present invention is disclosed. An aircraft or spacecraft having a seat according to the present invention is also disclosed.

BRIEF DESCRIPTION OF THE DRAWINGS

In the following, the invention will be described in more detail on the basis of embodiments with reference to the accompanying figures of the drawings.

FIG. 1 is a schematic perspective view of a seat cover according to the present invention;

FIG. 2 is a schematic perspective view of the seat cover according to FIG. 1;

FIG. 3 is a schematic perspective view of a further seat cover;

FIG. 4 is a schematic perspective view of a seat with a respective cover according to FIG. 3.

DETAILED DESCRIPTION

Figure 5:
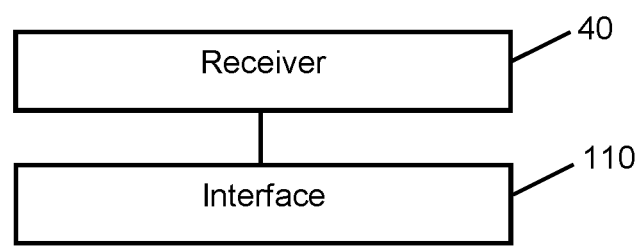
FIG. 5 is a schematic drawing of a receiver and interface connection.

FIG. 1 is a schematic perspective view of a seat cover 10 according to the invention which can be joined to the region of a headrest (not shown) of an aircraft seat (not shown). The seat cover 10 is preferably joined to the aircraft seat by being placed over the headrest. The seat cover 10 has a body 20 as a thin flat body which is substantially rectangular in shape. The cover body 20 consists of a non-rigid material so that it can easily adapt to the shape of the headrest.

Provided in the region of the sides of the cover body 20 are respective closing tapes 60 which are configured to form with the cover body 20 a closed periphery around the peripheral region of the headrest. When the seat cover 10 is joined to the headrest, the lateral regions of the headrest are not covered by the seat cover 10, except for the region of the closing tapes 60 arranged on the sides in each case. However, in an equivalent alternative, the lateral regions of the headrest can also be covered by the seat cover 10.

In the region of one side, the cover body 20 has a recess 30 which is substantially rectangular in shape. The recess 30 extends in the longitudinal direction of the cover body 20 starting from the central region thereof towards the respective longitudinal edges of the seat cover 10 over a predetermined length. Arranged in the inner surface region of the cover body 20, in the region of the recess 30 is a receiver 40 which is provided for receiving an electronic video or entertainment device (not shown).

When the seat cover 10 is joined as intended to the headrest, the recess 30 and the receiver 40 are located in the rearward region of the aircraft seat.

FIG. 2 is a schematic perspective view of the seat cover according to FIG. 1 from the opposite side, part of an electronic device 50 having been received by the receiver 40. An arrow indicates the insertion direction of the electronic device 50 into the receiver 40.

Figure 6:
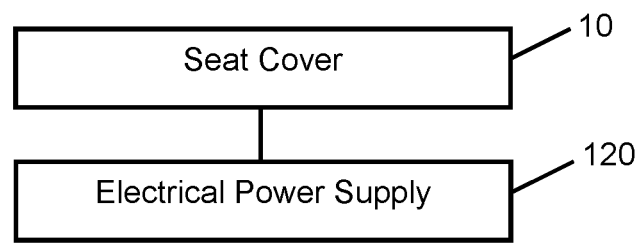
FIG. 6 is a schematic drawing of a seat cover and electrical power supply connection.

The electronic device 50 is preferably a so-called commercial-off-the-shelf device (COTS device), i.e. a commercially available device. The distance between the receiver 40 and the electronic device 50 in a vertical direction during the introduction of the electronic device 50 is selected such that the electronic device 50 can be inserted without difficulty. The receiver 40 also has an interface 110 for charging the electronic device 50 as soon as the electronic device 50 has been fully inserted into the receiver 40 (FIG. 5). Furthermore, a display (not shown) can be provided which indicates to the passenger the prevailing electrical charge of the electronic device 50. The seat cover 10 can be connected to an electrical power supply 120 of the seat (FIG. 6).

The receiver 40 receives the front and back of the electronic device 50 in each case via a contact region, so that the electronic device 50 is received in a substantially clearance-free manner in the transverse direction when it is being received by the receiver 40.

The receiver 40 has two window-shaped elements 70 which are arranged parallel to one another and at a distance from one another, the distance thereof substantially corresponding to the thickness of the electronic device 50. The receiver 40 is formed in the region of the upper side and lower side thereof in each case by parallel u-shaped elements (not shown), the distance of which substantially corresponds to the height of the electronic device 50.

FIG. 3 is a schematic perspective view of a further seat cover according to the present invention, which can be joined to the region of a headrest (not shown) of an aircraft seat (not shown). The seat cover 10 is preferably joined to the aircraft seat by being placed over the headrest. The seat cover 10 has a body 20 as a thin flat body which is substantially rectangular in shape. The cover body 20 consists of a non-rigid material so that it can easily adapt to the shape of the headrest.

Provided in the region of the sides of the cover body 20 are respective closing tapes 60 which are configured to form with the cover body 20 a closed periphery around the peripheral region of the headrest. When the seat cover 10 is joined to the headrest, the lateral regions of the headrest are not covered by the seat cover 10, except for the region of the closing tapes 60 arranged on the sides in each case. However, in an equivalent alternative, the lateral regions of the headrest can also be covered by the seat cover 10.

In the region of one side, the seat cover 20 has a receiver in the manner of a pocket 80 which has an interior for receiving an electronic device (not shown). The outside of the pocket 80 also has a recess 30 which is substantially rectangular in shape. The recess 30 extends in the longitudinal direction of the pocket 80 starting from the central region thereof towards the respective longitudinal ends of the pocket 80 over a predetermined length which substantially corresponds to the size of the screen of the electronic device.

The pocket 80 and the seat cover body 20 are joined together by a swivel means 81 which is arranged in the region of the upper end of the pocket 80. The pocket 80 can thereby be swivelled with respect to the seat cover 10, as a result of which the passenger always has an optimum view of the recess 30. Arranged in the region of the upper side of the pocket 80, in the central region thereof, is a strap 82 which is used to secure the electronic device which can be received in the pocket 80.

When the seat cover 10 is joined as intended to the headrest, the recess 30 and the pocket 80 are located in the rearward region of the aircraft seat.

In the region below the first pocket 80, the seat cover body 20 has a receiver in the manner of a second pocket 90 which has an interior for receiving a further electronic device (not shown). The further electronic device is preferably a PED device, such as an iPhone or a device configured for the playback of multimedia content.

The outside of the second pocket 90 also has a second recess 91 which is substantially rectangular in shape. The second recess 91 extends in the longitudinal direction of the second pocket 90 starting from the central region thereof towards the respective longitudinal edges of the second pocket 90 over a predetermined length which substantially corresponds to the size of the screen of the further electronic device.

The second pocket 90 and the seat cover body 20 are joined together by a second swivel means 92 which is arranged in the region of the upper end of the second pocket 90. The second pocket 90 can thereby swivel with respect to the seat cover 10, so that the passenger has an optimum view of the second recess 91 at all times.

The dimensions both in the longitudinal direction and in the transverse direction of the second pocket 90 amount to only a fraction of the respective longitudinal and transverse dimensions of the first pocket 80.

FIG. 4 is a schematic perspective view of a seat 100 which comprises three aircraft seats arranged next to and adjoining one another. Each aircraft seat has a respective cover 10 according to the present invention. The seat cover 10 has a receiver 40 which is joined to the body of the seat cover 10 such that the receiver 40 is configured to be adjustable with respect to the seat cover body. The receiver 40 thus has a hinge device (not shown), by which the electronic device 50 can be swivelled relative to the seat cover 10 towards or away from the passenger (not shown), as respectively indicated by the arrows.

Although the present invention has been described above on the basis of preferred embodiments, it is not restricted thereto, but rather can be modified in many different ways.

For example, the receiver 40 can have on the outside a protective element formed from a transparent material. Furthermore, the surface of the protective element can be configured such that it is substantially reflection-free.

What is claimed is:

1. A cover for a seat in an aircraft or spacecraft, said cover being attachable to and removable from the seat, said cover comprising:

closing tapes provided in a region of respective sides of a cover body, wherein said closing tapes are configured to form with the cover body a closed periphery around a peripheral region of a headrest, wherein lateral regions of the seat cover are open such that the seat cover is adapted to not cover the lateral regions of the headrest except for a region of the closing tapes arranged on the sides; and a receiver which is configured to receive in an exchangeable manner an electronic device which is fitted with a screen, wherein at least one recess is provided in a region of the receiver such that the screen of the electronic device is exposed for viewing through the recess, wherein the receiver is configured as a pocket, the pocket comprising a flexible portion of an upper end of a rear wall of the pocket folded back on itself and attached along a swivel line to the cover body such that a lower portion of the pocket is free to swivel towards and away from the seat, the cover further comprising a strap attached at a first end of the strap to the cover body at the swivel line, a second end of the strap extending outward from the cover body over an opening of the pocket for closing engagement of the second end of the strap with a front wall of the pocket above the recess to secure the electronic device when in the pocket.

2. The seat cover according to claim 1, wherein the receiver is arranged on an outside of the seat cover.

3. The seat cover according to claim 1, wherein the receiver is configured such that the electronic device is received in the receiver in an exchangeable manner.

4. The seat cover according to claim 1, wherein the receiver is configured to receive an electronic device configured as a tablet PC or as a PDA.

5. The seat cover according to claim 1, wherein the pocket is configured as a pocket for holding the electronic device.

6. The seat cover according to claim 5, wherein the pocket comprises a closure associated with the strap configured to protect the electronic device accommodated in the pocket against theft.

7. The seat cover according to claim 1, wherein the receiver is arranged on a side remote from a contact region between the seat cover and a passenger.

8. The seat cover according to claim 1, wherein the receiver is configured to provide an adapter, particularly in a manner of a casing, for receiving the electronic device.

9. The seat cover according to claim 1, wherein the seat cover has fastening elements for joining the cover to the seat, said fastening elements being configured and shaped such that they are used to attach the cover to seats of different dimensions.

10. The seat cover according to claim 1, wherein the receiver is joined to the seat cover such that the receiver is configured to be adjustable with respect to the seat cover.

11. The seat cover according to claim 1, wherein the seat cover can be connected to an electrical power supply of the seat, and the receiver is configured such that it has an electric interface to the electrical power supply of the electronic device.

12. A seat with a cover according to claim 1.

13. An aircraft or spacecraft having at least one seat according to claim 12.

14. The seat cover according to claim 1, wherein the receiver comprises a protective element arranged in a region of an outside surface of the receiver to protect the screen of the electronic device.

15. The seat cover according to claim 1, wherein the seat cover further comprises a second receiver configured to receive in an exchangeable manner a further electronic device fitted with a further screen, and comprising at least one further recess in a region of the second receiver such that the further screen of the further electronic device is exposed for viewing.

16. The seat cover according to claim 15, wherein the pocket and the second receiver are configured as pockets for holding the respective electronic devices.

17. The seat cover according to claim 15, wherein the second receiver is configured to receive a smaller electronic device than the pocket is configured to receive.

* * * * *